(12) United States Patent
Yoshioka

(10) Patent No.: US 7,413,066 B2
(45) Date of Patent: Aug. 19, 2008

(54) HYDRAULICALLY CONTROLLED TORQUE COUPLING DEVICE

(75) Inventor: Jun Yoshioka, Waterville, OH (US)

(73) Assignee: Dana Automotive Systems Group, LLC., Toledo, OH (US)

( * ) Notice: Subject to any disclaimer, the term of this patent is extended or adjusted under 35 U.S.C. 154(b) by 814 days.

(21) Appl. No.: 10/778,209

(22) Filed: Feb. 17, 2004

(65) Prior Publication Data

US 2005/0178636 A1     Aug. 18, 2005

(51) Int. Cl.
*F16D 31/02*     (2006.01)
(52) U.S. Cl. .......................... 192/59; 464/27
(58) Field of Classification Search ................ 192/59, 192/60, 103 F; 464/24, 27, 38
See application file for complete search history.

(56) References Cited

U.S. PATENT DOCUMENTS

| | | | | |
|---|---|---|---|---|
| 1,913,003 | A * | 6/1933 | Shaff | 173/222 |
| 3,298,489 | A * | 1/1967 | Brand | 192/58.92 |
| 3,530,964 | A * | 9/1970 | Maguire | 192/59 |
| 4,597,483 | A * | 7/1986 | Porel et al. | 192/59 |
| 4,770,651 | A * | 9/1988 | Friedrich | 464/27 |
| 5,103,642 | A * | 4/1992 | Suzuki et al. | 60/413 |
| 5,106,347 | A | 4/1992 | Takemura et al. | |
| 5,297,994 | A * | 3/1994 | Suzuki et al. | 464/27 |
| 5,598,911 | A * | 2/1997 | Joachim et al. | 192/59 |
| 5,979,631 | A | 11/1999 | Lundstrom | |
| 6,651,794 | B2 * | 11/2003 | Smith | 192/59 |
| 2003/0015060 | A1 | 1/2003 | Lee | |

FOREIGN PATENT DOCUMENTS

GB    405 429 A    2/1934
GB    2 371 840 A   8/2002

* cited by examiner

*Primary Examiner*—Rodney H Bonck
(74) *Attorney, Agent, or Firm*—Berenato, White & Stavish (57) ABSTRACT

A hydraulically actuated torque coupling device is provided for transmitting a drive torque from an input to at least one output. The torque coupling device comprises a rotatable hydraulic manifold block having a plurality of cylinder bores defined therein, a multi-lobed cam ring rotatable coaxially with the manifold block, a plurality of pistons each disposed within corresponding one of the plurality of cylinder bores in the manifold block for reciprocating therewithin upon relative rotational movement between the manifold block and the cam ring and defining a plurality of pressure chambers within the corresponding cylinder bores, and restrictor device in fluid communication with each of the plurality of pressure chambers such that the restrictor device controls a discharge pressure attainable within each of the plurality of pressure chambers during discharge strokes. Each of the plurality of pistons rotably engages the at least one cam ring at distal ends thereof.

21 Claims, 6 Drawing Sheets

HYDRAULICALLY CONTROLLED TORQUE COUPLING DEVICE

BACKGROUND OF THE INVENTION

1. Field of the Invention

The present invention relates to torque coupling devices in general, and more particularly to a hydraulically actuated torque coupling device provided for transmitting a drive torque at from an input to at least one output.

2. Description of the Prior Art

Conventionally, torque coupling devices well known in the prior art, and are used in various applications, such as vehicular drivetrains, to limit slip and transfer drive torque between a pair of rotary members. In all-wheel drive applications, torque coupling devices are used to automatically control the drive torque transferred from a driven member to a non-driven member in response to speed differentiation therebetween. In limited slip applications, couplings are used in association with a differential to automatically limit slip and bias the torque distribution between a pair of rotary members.

Such torque coupling devices conventionally use a frictional clutch between the rotary members. The frictional clutch may be selectively actuated by various hydraulic actuator assemblies, which are constructed of elements disposed inside a casing. The hydraulic actuator assemblies internal to the casing often include displacement pumps disposed inside the casing and actuated in response to a relative rotation between the differential case and the output shaft. The displacement pumps are usually in the form of internal gear pumps, such as gerotor pumps adapted to convert rotational work to hydraulic work. The hydraulic actuator assemblies further include a hydraulic piston member for frictionally loading the friction clutch.

While known torque coupling devices, including but not limited to those discussed above, have proven to be acceptable for various vehicular driveline applications, such devices are nevertheless susceptible to improvements that may enhance their performance and reduce cost. With this in mind, a need exists to develop improved torque coupling devices that advance the art.

SUMMARY OF THE INVENTION

The present invention provides a novel hydraulically actuated torque coupling device provided for transmitting a drive torque from an input to at least one output.

The torque coupling device in accordance with the present invention comprises a rotatable hydraulic manifold block having at least one plurality of cylinder bores defined therein, at least one multi-lobed cam ring rotatable relative to and coaxially with the hydraulic manifold block, at least one plurality of pistons each disposed within corresponding one of the at least one plurality of cylinder bores in the manifold block for reciprocating therewithin upon relative rotational movement between the manifold block and the at least one cam ring. The at least one plurality of first pistons defines a corresponding plurality of variable displacement pressure chambers within the corresponding one of the at least one plurality of the cylinder bores.

The torque coupling device in accordance with the present invention further includes at least one restrictor device in fluid communication with each of the at least one plurality of pressure chambers such that the at least one restrictor device controls a discharge pressure attainable within each of the at least one plurality of pressure chambers during discharge strokes of the at least one plurality of pistons. Each of the at least one plurality of pistons engages the at least one cam ring at distal ends thereof.

Preferably, the at least one restrictor device is provided to selectively set the discharge pressure attainable within each of the at least one plurality of pressure chambers between a maximum pressure value and a minimum pressure value, wherein the minimum pressure value is at a level that prevents actuation of the torque coupling device and the maximum pressure value is at a level that enables complete actuation of the torque coupling device. When the at least one restrictor device is adjusted to set the discharge pressure attainable in each of the at least one plurality of pressure chambers is adjustable between the minimum pressure value and the maximum pressure value so as to the torque coupling device is partially actuated. The at least one restrictor device is selectively and variably controlled by an electronic controller in response to at least one vehicle parameter, such as input and output speed sensors, vehicle wheel speed sensors, an ABS activation sensor that detects the activation of the anti-lock braking system, a yaw rate sensor, a steering angle sensor, etc.

The torque coupling device in accordance with the present invention further includes at least one fluid reservoir for storing a supply of a hydraulic fluid. The at least one fluid reservoir is in fluid communication with both the plurality of pressure chambers and the at least one restrictor device, and is, preferably, disposed within the hydraulic manifold block.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiments of the present invention will now be described with the reference to accompanying drawings.

Figure 1:
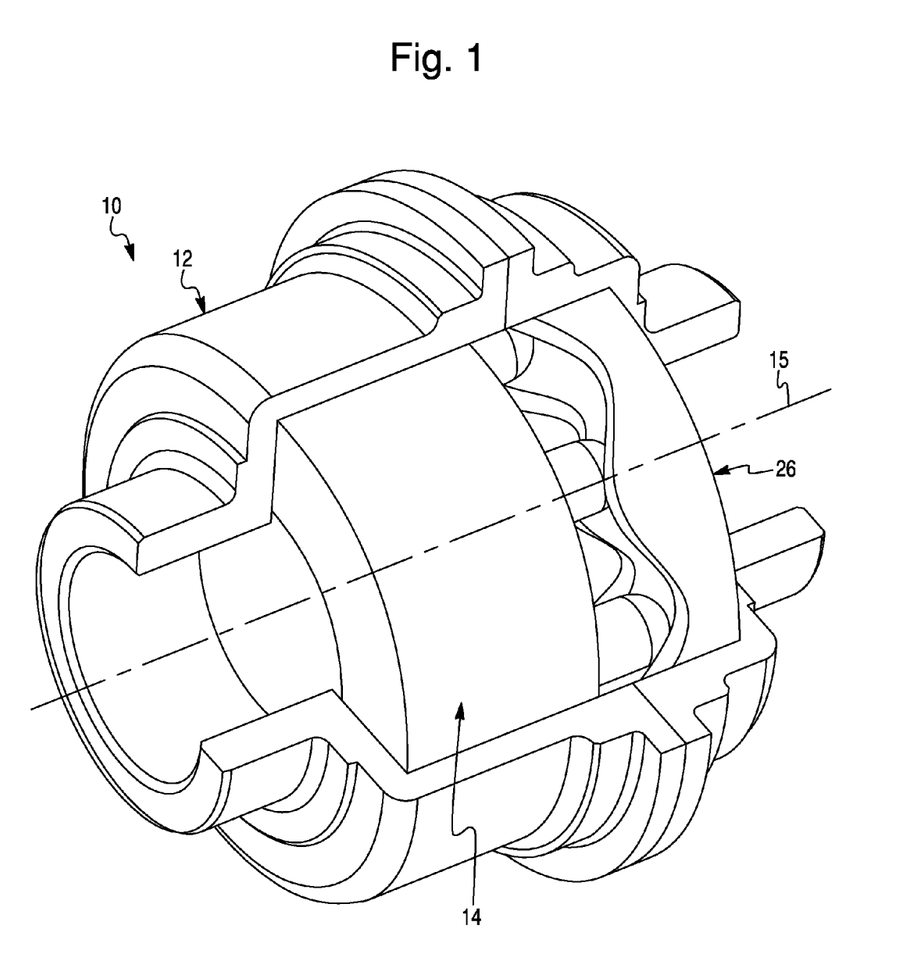
FIG. 1 is a perspective view of a torque coupling device in accordance with a first exemplary embodiment of the present invention.
Figure 2:
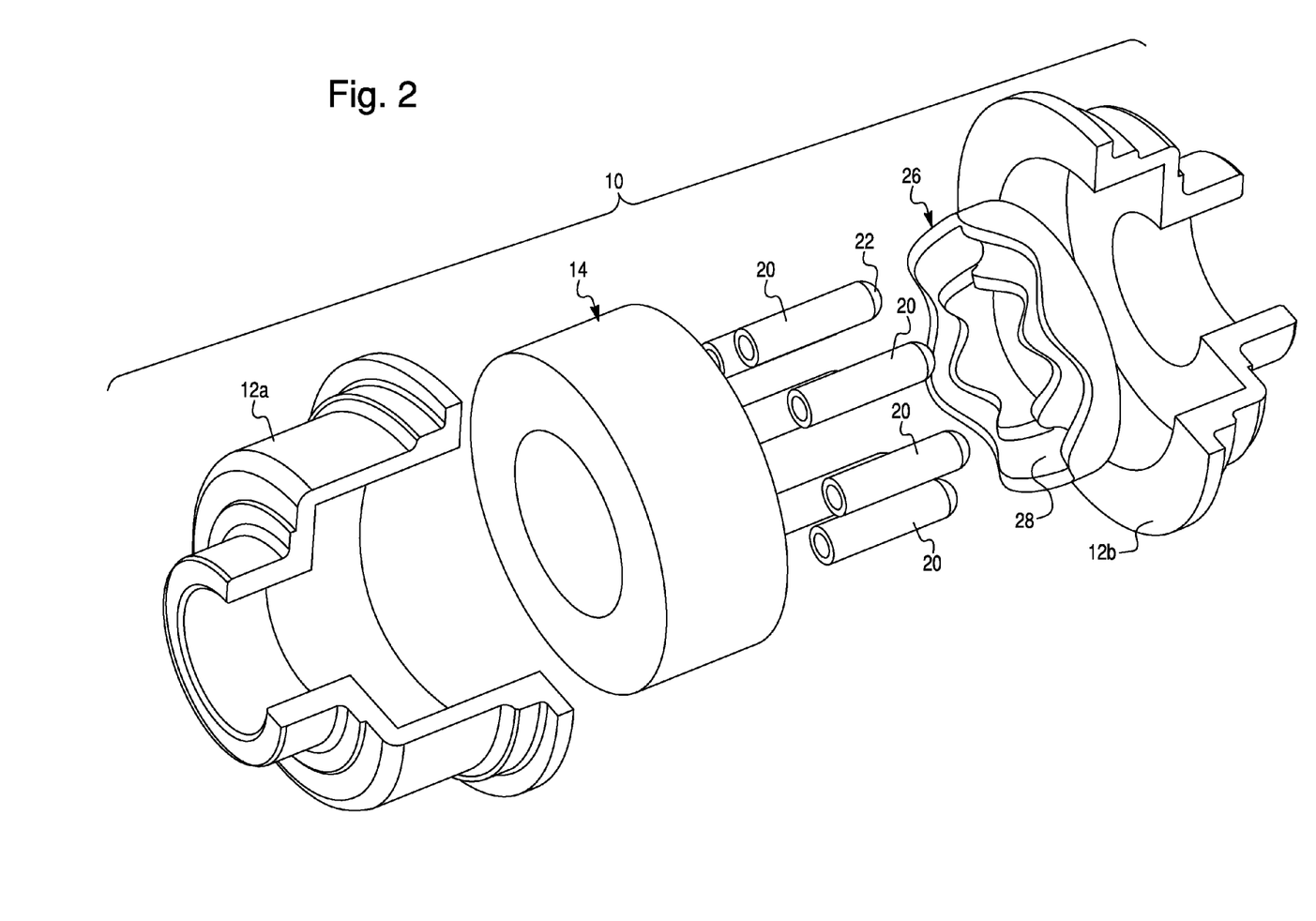
FIG. 2 is an exploded perspective view of the torque coupling device in accordance with the first exemplary embodiment of the present invention.
Figure 3:
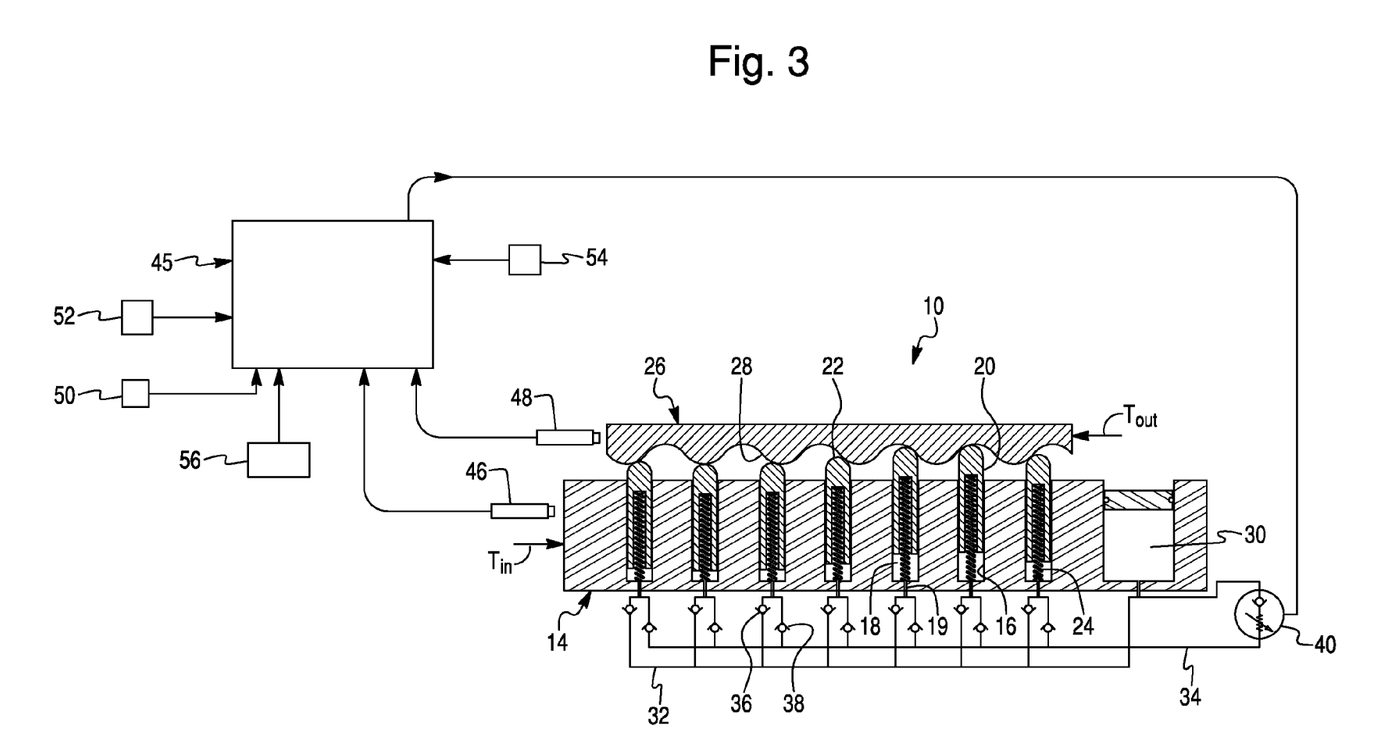
FIG. 3 is a schematic view of a hydraulic circuit of the torque coupling device in accordance with the first exemplary embodiment of the present invention showing partial schematic cross section of the torque coupling device.

FIGS. 1-3 depict a selectively operable torque coupling device 10 in accordance with the first exemplary embodiment of the present invention. The torque coupling device 10 comprises a substantially cylindrical housing 12 rotatably supporting therewithin a hydraulic manifold block 14 rotatable about an axis of rotation 15 and a multi-lobed cam ring 26 coaxial to the hydraulic manifold block 14. The hydraulic manifold block 14 and the multi-lobed cam ring 26 are rotatably supported within the housing 12 by appropriate anti-friction bearings, such as roller bearings. Preferably, the cylindrical housing 12 includes two halves 12a and 12b secured to each other in a manner known to those skilled in the art, such as by threaded fasteners, welding, riveting, etc.

In accordance with the first exemplary embodiment of the present invention, the hydraulic manifold block 14 is drivingly coupled to an input shaft (not shown), while the multi-lobed cam ring 26 is drivingly coupled to an output shaft (not shown). Correspondingly, an input torque $T_{IN}$ is applied to the hydraulic manifold block 14 from the input shaft, while an output torque $T_{OUT}$ is transmitted to the output shaft through the cam ring 26, as shown in FIG. 3. The torque coupling device 10 of the first exemplary embodiment of the present invention is capable to vary a torque transfer rate, i.e. the $T_{IN}/T_{OUT}$ ratio, transmitted from the input shaft to the output shaft by the torque coupling device 10. It will be appreciated that alternatively, the hydraulic manifold block 14 may be drivingly coupled to the output shaft, while the multi-lobed cam ring 26 is drivingly coupled to the input shaft.

As further illustrated in FIGS. 1-3, the hydraulic manifold block 14 is substantially cylindrical in shape and includes a plurality of axially extending open cylinder bores 16 formed therein. Preferably, the cylinder bores 16 are equidistantly circumferentially spaced about the axis of rotation 15. The cam ring 26 is formed with a cam surface 28 having a plurality of alternating cam crests (or lobes) and cam valleys at regular intervals. The cam surface 26 faces the cylinder bores 16 of the hydraulic manifold block 14.

The torque coupling device 10 further includes a plurality of pistons 20. The number of the pistons 20 corresponds to the number of the cylinder bores 16 in the hydraulic manifold block 14 so that each of the pistons 20 is slideably disposed within corresponding one of the plurality of the cylinder bores 16 in the hydraulic manifold block 14 for reciprocating therewithin upon relative rotational movement between the hydraulic manifold block 14 and the multi-lobed cam ring 26. Each of the pistons 20 defines a variable displacement pressure chamber 18 within the corresponding one of the plurality of cylinder bores 16. The cylinder bores 16 and the pistons 20 are preferably ring-shaped. However, alternatively, the cylinder bores 16 and the pistons 20 may have other suitable shapes. An intake/discharge hole 19 is formed in a bottom portion of each of the pressure chamber 18. Distal ends 22 of the pistons 20 extend from the cylinder bores 16 as the pistons 20 are biased toward the cam surfaces 28 of the cam ring 26 by coil springs 24 disposed within the pressure chambers 18. The distal ends 22 of the pistons 20 rotateably and slideably engage the cam surface 28 the multi-lobed cam ring 26 due to biasing forces of the coil springs 24. Preferably, the distal ends 22 of the pistons 20 are semi-spherical in shape.

As further illustrated in FIG. 3, each of the pressure chambers 18 is in fluid communication with a fluid reservoir 30 storing a supply of an appropriate hydraulic fluid, such as oil, through a supply passageway 32 and a discharge passageway 34. Preferably, the fluid reservoir 30 is integrally formed within the hydraulic manifold block 14.

As the pressure chambers 18 are in fluid communication with the fluid reservoir 30, the reciprocating movement of the pistons 20 within the cylinder bores 16 in the hydraulic manifold block 14 upon relative rotational movement between the hydraulic manifold block 14 and the cam ring 26 provides a pumping action including alternating suction and discharge strokes.

During the suction stroke when the pistons 18 extend from the cylinder bores 16 of the hydraulic manifold block 14, volumes of the pressure chambers 18 increase and the hydraulic fluid is drawn into the pressure chambers 18 from the fluid reservoir 30 through the supply passageway 32. Accordingly, during the discharge stroke when the pistons 18 retract into the cylinder bores 16, volumes of the pressure chambers 18 decrease and the hydraulic fluid is discharged under pressure from the pressure chambers 18 back to the fluid reservoir 30 through the discharge passageway 34. In other words, the pressure chambers 18 function to cooperate with the pistons 20 to pressurize the hydraulic fluid during the discharge stroke of the pistons 20.

Preferably, as shown in FIGS. 1-3, the hydraulic manifold block 14 of the torque coupling device 10 in accordance with the first exemplary embodiment of the present invention comprises seven cylinder bores 16 and seven associated pistons 20, while the multi-lobed cam ring 26 has six lobes. This arrangement provides at least three pistons 20 in the discharge stroke and at least three pistons in the suction stroke. It will be appreciated that more or less cylinder bores/pistons and cam lobes may be employed depending upon the relative dimensions and proportions of the particular arrangement of the torque coupling device.

In order to control the fluid pressure in the pressure chambers 18 and, subsequently, the torque transfer through the torque coupling device 10, a variable restrictor device 40 is provided, as illustrated in FIG. 3. The variable restrictor device 40 according to the present invention, is provided to selectively control the hydraulic pressure in the pressure chamber 18 during the discharge stroke. More specifically, the variable restrictor device 40 is adapted to provide a variable resistance to the hydraulic fluid flow in the discharge passageway 34, thud controlling the hydraulic pressure in the pressure chamber 18 during the discharge stroke. Obviously, the bigger the resistance, the higher the hydraulic pressure in the pressure chamber 18 during the discharge stroke.

The variable restrictor device 40 is located in the discharge passageway 34 so that the hydraulic fluid is discharged from any of the pressure chambers 18 back to the fluid reservoir 30 during the discharge stroke through the restrictor device 40. As further illustrated in FIG. 3, the variable restrictor device 40 is operated by an electronic controller 45, which may be in the form of a CPU or a computer. The electronic controller 45 operates the variable restrictor device 40 based on the information from a number of sensors including, but not limited, an input speed sensor 46 and an output speed sensor 48. It will be appreciated by those skilled in the art that any other appropriate sensors, may be employed. For instance, if the torque coupling device 10 is used in a drivetrain of a four-wheel drive (4WD) motor vehicle to selectively engage an auxiliary drive axle assembly, vehicle wheel speed sensors 50, a yaw rate sensor 52, a steering angle sensor 54, etc., also may be employed. Moreover, the electronic controller 45 may be connected to an electronic control network 56 of the motor vehicle.

Preferably, as illustrated in FIG. 3, the variable restrictor device 40 is in the form of a variable check valve operated by an electromagnetic (preferably, solenoid) actuator, electronically controlled by the controller 45. The check valve 40 of the preferred embodiment of the present invention includes a valve closure member (not shown) biased against a valve seat (not shown) by an axial force of a magnetic flux generated by an electro-magnetic device (preferably, solenoid) (not shown). When energized, solenoid-operated check valve 40 is capable of modulating a retaining force of the valve closure member against the valve seat depending on an electrical current supplied to the solenoid, thus, variably adjusting a discharge pressure of the hydraulic fluid from the pressure chambers 18 in a variable range from a minimum pressure to a maximum pressure.

When a maximum current is applied to the solenoid, the retaining force of the check valve 40 is at its maximum, thus the hydraulic pressure attainable within the pressure chamber 18 during the discharge stroke of the piston 20 is at its maximum value. In this configuration, the torque coupling device 10 is in the fully "ON" condition in that the maximum discharge pressure which can be obtained in the piston pressure chamber 18 is sufficient to fully actuate the torque coupling device 10, i.e. to transfer all the torque from the input shaft to the output shaft, thus providing a 100% torque transfer rate through the torque coupling device 10.

As the less current is applied to the solenoid, the less axial retaining force is exerted to the check valve 40, thus the less is the discharge pressure attainable within the pressure chamber 18 during the discharge stroke of the piston 20.

When a minimum current is applied to the solenoid, the retaining force of the check valve 40 is at its minimum, thus the hydraulic discharge pressure attainable within the pressure chamber 18 during the discharge stroke of the piston 20 is at its minimum value. In this configuration, the torque coupling device 10 is in the fully "OFF" condition in that the maximum discharge pressure which can be obtained in the piston pressure chamber 18 is not high enough to transfer any torque through the torque coupling device 10 from the input shaft to the output shaft.

In between the "ON" and "OFF" conditions of the torque coupling device 10, the variable check valve 40 may be set at any value between these limits by modulating the current applied to the solenoid. This provides the torque coupling device 10 with an infinitely variable torque transfer rate to match various operating conditions of apparatuses or machines employing the torque coupling device 10 of the present invention, such as motor vehicles.

Alternatively, the variable restrictor device 40 includes a variable valve opening adapted to selectively control a fluid flow through the variable restrictor device 40 by selectively varying the valve opening therein between a fully closed position providing a minim flow through the variable restrictor device 40 and a fully open position providing a maximum flow through the variable restrictor device 40. It will understood by those skilled in the art that when the valve opening in the variable restrictor device 40 is fully closed, the hydraulic discharge pressure attainable within the pressure chamber 18 during the discharge stroke of the piston 20 is of a maximum value. Correspondingly, when the valve opening in the variable restrictor device 40 is fully open, the hydraulic discharge pressure attainable within the pressure chamber 18 during the discharge stroke of the piston 20 is of a minimum value. It will be appreciated, that varying the opening of the variable restrictor device 40, the hydraulic discharge pressure attainable within the pressure chamber 18 during the discharge stroke may be set at any value by modulating the control signal applied to the variable restrictor device 40 by the electronic controller 45.

The operation of the first exemplary embodiment of the present invention depicted in FIGS. 1-3 will now be described.

When no rotational speed difference occurs between the hydraulic manifold block 14 and the cam ring 26, the pistons 20 do not reciprocate in the cylinder bores 16 and the pistons 20 do not pump the hydraulic fluid into the pressure chamber 18. Thus, the torque is not transferred through the torque coupling device 10 from the input shaft to the output shaft. Therefore, if the torque coupling device 10 is used in the drivetrain of the 4WD motor vehicle, the driving torque from an engine is not transferred to the auxiliary drive axle assembly. At this time, the pistons 26 are pressed against the cam surface 28 of the cam ring 26 by the coil springs 24.

When, however, the rotational speed differential between the output shaft and the input shaft occurs (i.e., when there is relative rotational movement of the manifold block 14 and the cam ring 26), the rotational speed differential between the manifold block 14 and the cam ring 26 causes the pistons 20 to reciprocate in the cylinder bores 16 since they slide on the crests and cam valleys of the cam surface 28. When the pistons 20 reciprocate, the hydraulic fluid is alternately drawn into the pressure chambers 18 from the fluid reservoir 30 through the supply passageway 32 and the intake/discharge hole 19 (during the suction stroke), and is discharged under pressure from the pressure chambers 18 back to the fluid reservoir 30 through the intake/discharge hole 19, the discharge passageway 34 and through the flow restriction provided by the variable restrictor device 40 (the discharge stroke).

Owing to the flow restriction provided by the variable restrictor device 40, a pressure increase occurs in each of the pressure chambers 18 on the discharge strokes of the pistons 20. If the pressure in the pressure chamber 18 is sufficient to resist axial movement of the associated pistons 20 and to urge the pistons 20 into firm engagement the crests and valleys of the cam surface 28 of the cam ring 26, the torque coupling device 10 will resist relative rotational movement of the manifold block 14 and the cam ring 26. As a result, the torque is transmitted from the manifold block 14 and the cam ring 26.

Those skilled in the art would appreciate that depending on the specific adjustment of the variable restrictor device 40 by the electronic controller 45 various modes of operation of the torque coupling device 10 could be realized. More specifically, if the variable restrictor device 40 is adjusted to provide the minimum value of the discharge pressure attainable within the pressure chamber 18 during the discharge stroke of the piston 20 (the fully "OFF" condition), no torque is transmitted through the torque coupling device 10 despite the relative rotation between the input shaft and the output shaft (i.e. between the hydraulic manifold block 14 and the multi-lobed cam ring 26). In other words, the torque transfer rate of the torque coupling device 10 when the variable restrictor device 40 is in the fully "OFF" condition is zero.

On the other hand, if the variable restrictor device 40 is adjusted to provide the maximum value of the discharge pressure attainable within the pressure chamber 18 during the discharge stroke of the piston 20 (the fully "ON" condition), all the torque from the input shaft to the output shaft is transmitted through the torque coupling device 10 (i.e. from the hydraulic manifold block 14 and the multi-lobed cam ring 26). In other words, the torque transfer rate of the torque coupling device 10 when the variable restrictor device 40 is in the fully "ON" condition is 100%.

Evidently, by adjusting the variable restrictor device 40 to provide the value of the hydraulic pressure attainable within the pressure chamber 18 during the discharge stroke of the piston 20 between the "ON" and "OFF" conditions, the torque transfer rate of the torque coupling device 10 may be continuously varied in the 0-100% range by the electronic controller 45 based on the information from the sensors 46, 48, 50, 52 and 54. This provides the torque coupling device 10 with an opportunity to dynamically control the torque coupling device 10 of the present invention to match various operating conditions of apparatuses or machines employing the torque coupling device 10 of the present invention, such as motor vehicles.

Figure 4:
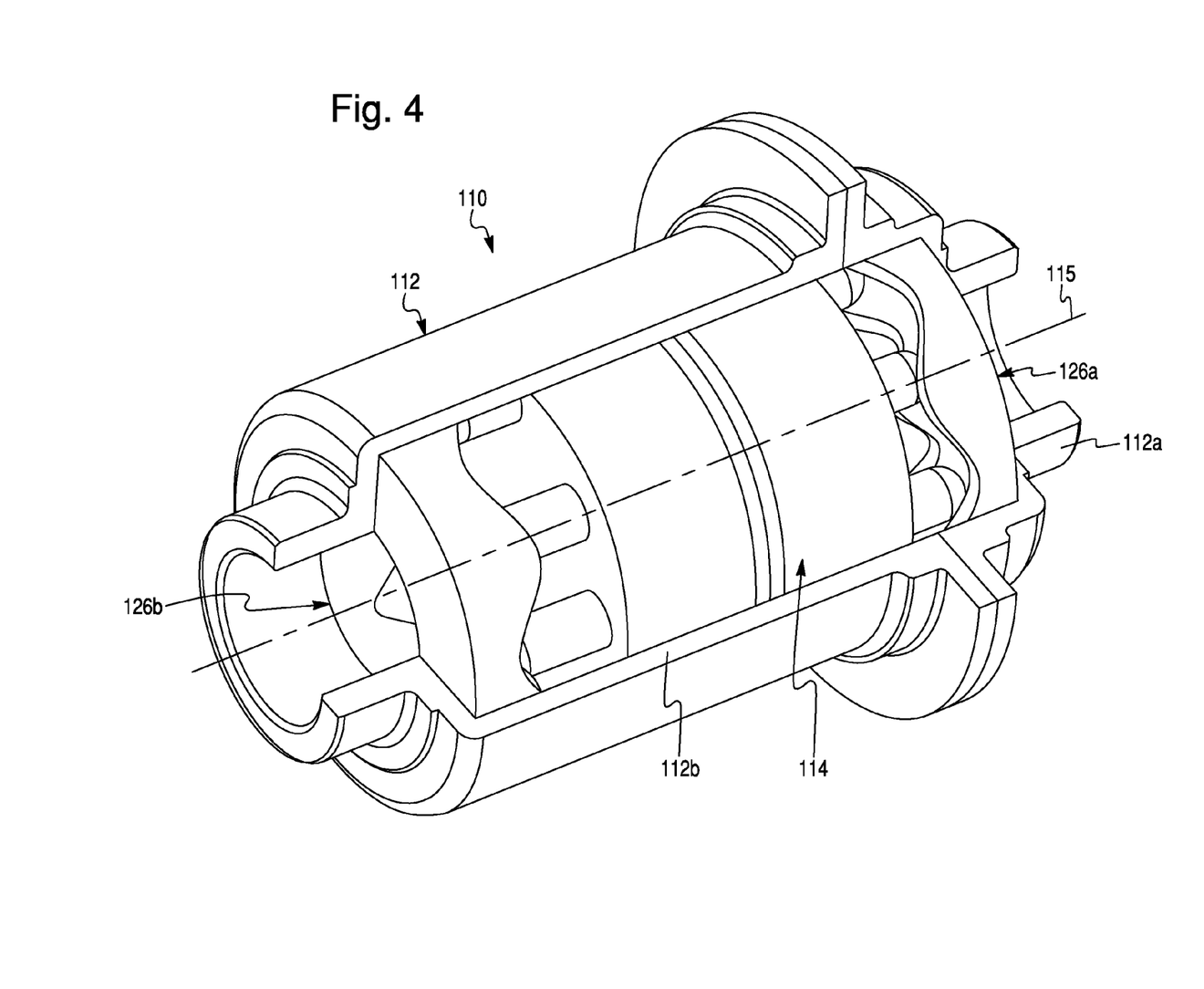
FIG. 4 is a perspective view of the torque coupling device in accordance with a second exemplary embodiment of the present invention.
Figure 5:
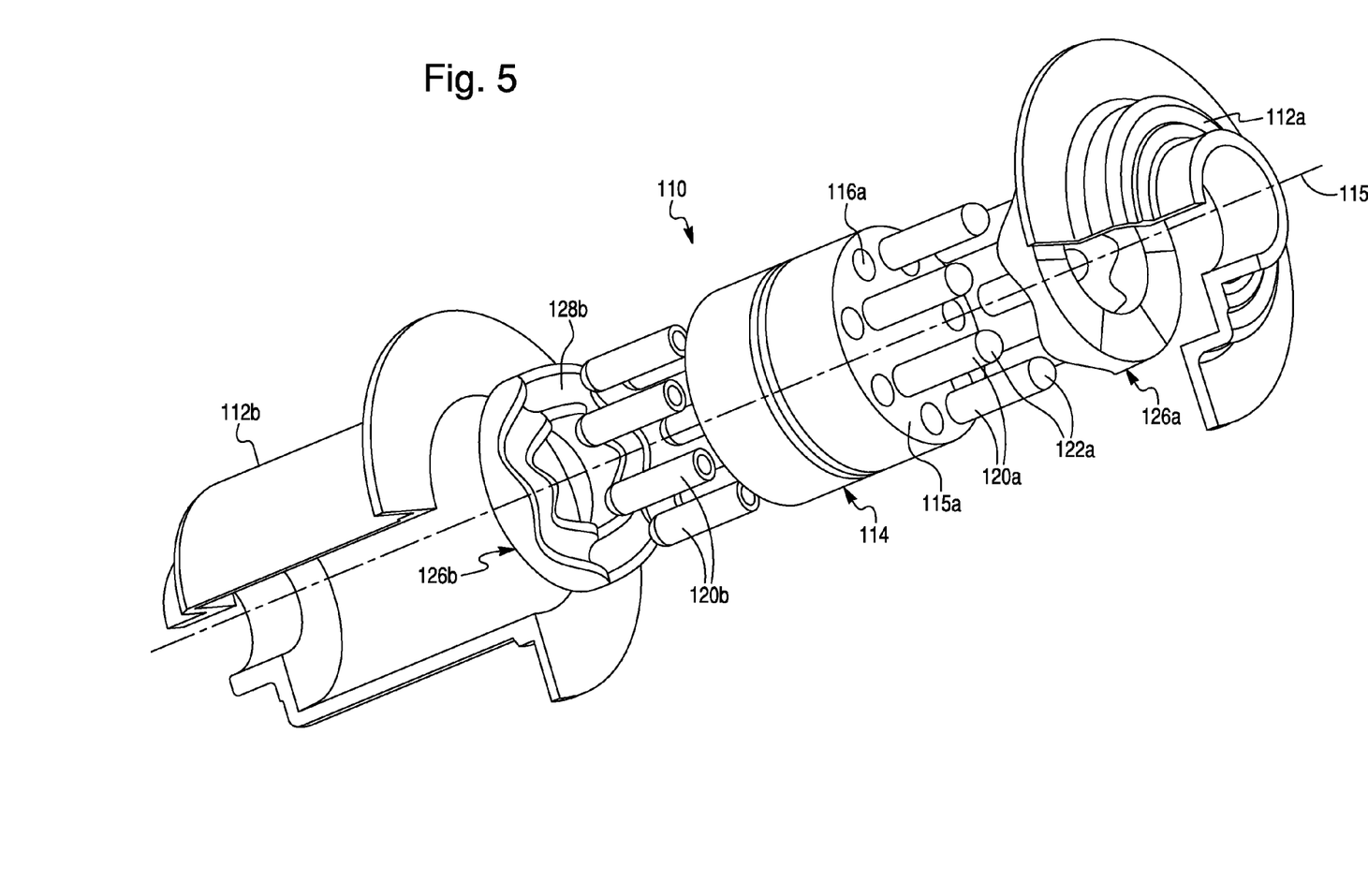
FIG. 5 is an exploded perspective view of the torque coupling device in accordance with the second exemplary embodiment of the present invention.
Figure 6:
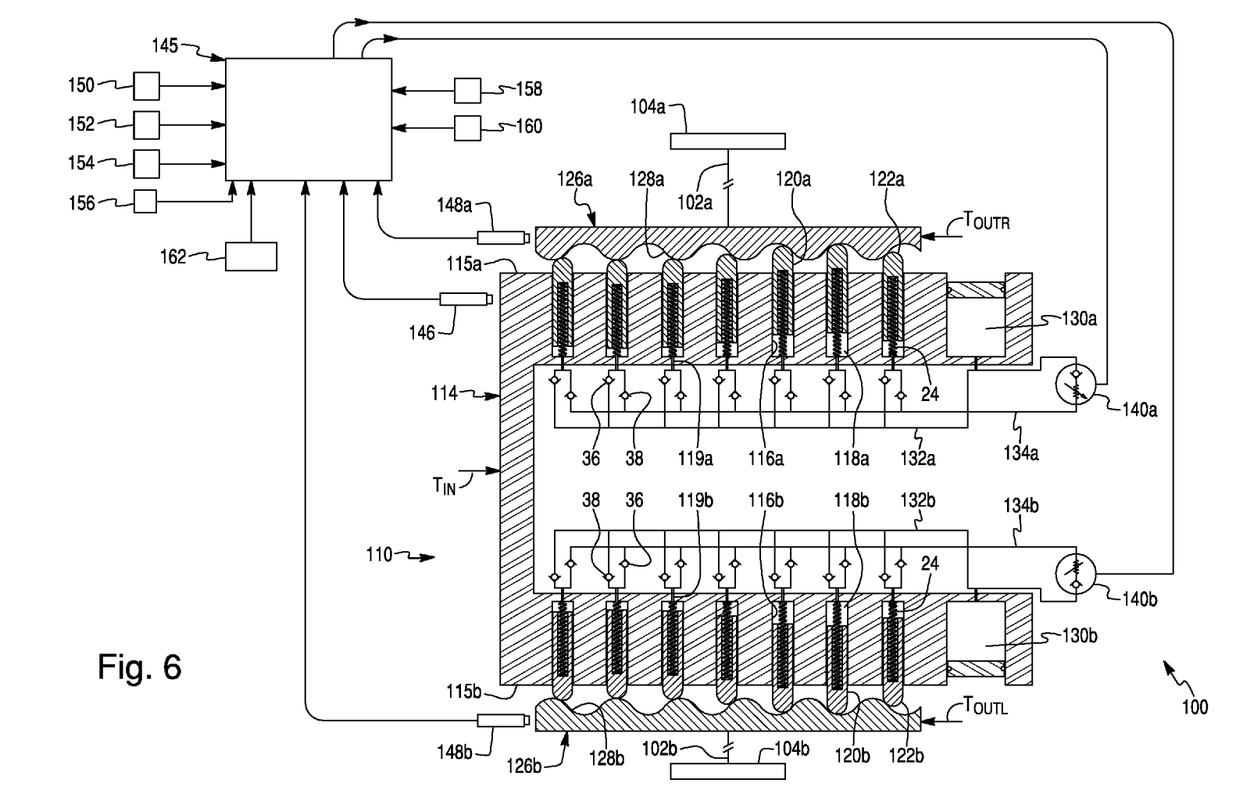
FIG. 6 is a schematic view of the hydraulic circuit of the torque coupling device in accordance with the second exemplary embodiment of the present invention showing partial schematic cross section of the torque coupling device.

FIGS. 4-6 of the drawings illustrate a second exemplary embodiment of a torque coupling device in accordance with the present invention. Components, which are unchanged from, or function in the same way as in the first exemplary embodiment depicted in FIGS. 1-3 are labeled with the same reference numerals, sometimes without describing detail since similarities between the corresponding parts in the two embodiments will be readily perceived by the reader.

FIGS. 4 and 5 depict a torque coupling device of the second exemplary embodiment of the present invention in the form of a differential assembly 110. As schematically illustrated in FIG. 6, the differential assembly 110 is provided for selectively actuate a drive axle unit 100 of a motor vehicle and to selectively distribute an input torque $T_{IN}$ from a prime mover, such as an internal combustion engine, between right and left output axle shafts 102a and 102b outwardly extending from the differential assembly 110 and drivingly coupled to right and left wheels 104a and 104b, respectively.

As illustrated in FIGS. 4 and 5, the differential assembly 110 includes a hollow differential case 112 rotatably supported within an axle housing (not shown) and driven by a final drive pinion gear (not shown) transmitting an input torque from the prime mover to the differential case 112. Preferably, the differential case 112 includes two halves 112a and 112b secured to each other in a manner known to those skilled in the art, such as by threaded fasteners, welding, riveting, etc.

The differential assembly 110 further comprises a hydraulic manifold block 114 disposed within the differential case 112 for rotation about an axis of rotation 115, and a first multi-lobed cam ring 126a and a second multi-lobed cam ring 126b both disposed within the differential case 112 adjacent to opposite sides of the hydraulic manifold block 114 coaxially thereto. It will be appreciated that the first and second cam rings 126a and 126b are rotatably supported within the differential case 112 by appropriate anti-friction bearings, such as roller bearings, while the hydraulic manifold block 114 is drivingly coupled to the differential case 112. Thus, the first and second cam rings 126a and 126b can rotate relative to the hydraulic manifold block 114.

In accordance with the second exemplary embodiment of the present invention, the hydraulic manifold block 114 is drivingly coupled to the differential case 112, while the first and second multi-lobed cam rings 126a and 126b are operatively coupled to the right and left output axle shafts 102a and 102b, respectively, as shown in FIG. 6. Correspondingly, the input torque $T_{IN}$ is applied to the hydraulic manifold block 114 from the final drive pinion gear through the differential case 112. The differential assembly 110 then transmits and distributes the input torque $T_{IN}$ from the hydraulic manifold block 114 to the first and second cam rings 126a and 126b. The first cam ring 126a operatively coupled to the output axle shaft 102a transmits an output torque $T_R$ to the right wheel 104a, while the second cam ring 126b operatively coupled to the output axle shaft 102b transmits an output torque $T_L$ to the left wheel 104b, as shown in FIG. 6. The differential assembly 110 of the second exemplary embodiment of the present invention is capable to vary transfer rates of torque transmitted from the input shaft to the right and left output shafts of the differential assembly 110, i.e. $T_{IN}/T_R$ and $T_{IN}/T_L$ ratios. It will be appreciated that alternatively, the differential assembly 110 of the second exemplary embodiment of the present invention may comprise two hydraulic manifold block drivingly coupled to the output axle shafts 102a and 102b, and a single multi-lobed cam ring is drivingly coupled to the differential case 112.

As further illustrated in FIGS. 4-6, the first cam ring 126a is formed with a first cam surface 128a having a plurality of alternating cam crests (or lobes) and cam valleys at regular intervals, while the second cam ring 126b is formed with a second cam surface 128b also having a plurality of alternating cam crests (or lobes) and cam valleys at regular intervals. Preferably, the first and second cam rings 126a and 126b are substantially identical.

Furthermore, the hydraulic manifold block 114 is substantially cylindrical in shape and has two opposite end faces 115a and 115b so that the end face 115a faces the first cam surface 128a of the first cam ring 126a, while the end face 115b faces the second cam surface 128b of the second cam ring 126b.

The hydraulic manifold block 114 also includes two sets of open cylinder bores formed therein: a plurality of first cylinder bores 116a and a plurality of second cylinder bores 116b. Preferably, both the first cylinder bores 116a and the second cylinder bores 116b are axially extending in the direction of the axis 115 so that the first cylinder bores 116a are open at the end face 115a, while the second cylinder bores 116b are open at the end face 115b. Further preferably, the cylinder bores 116a and 116b are equidistantly circumferentially spaced about the axis of rotation 115.

The differential assembly 110 further includes two sets of pistons: a plurality of first pistons 120a and a plurality of second pistons 120b.

The number of the first pistons 120a corresponds to the number of the first cylinder bores 116a in the hydraulic manifold block 114 so that each of the first pistons 120a is slideably disposed within corresponding one of the plurality of the first cylinder bores 116a in the hydraulic manifold block 114 for reciprocating therewithin upon relative rotational movement between the hydraulic manifold block 114 and the first multi-lobed cam ring 126a. Each of the first pistons 120a defines a first variable displacement pressure chamber 118a within the corresponding one of the plurality of the first cylinder bores 116a. Distal ends 122a of the first pistons 120a extend from the first cylinder bores 116a as the first pistons 120a are biased toward the first cam surfaces 128a of the first cam ring 126a by coil springs 24 disposed within the first pressure chambers 118a. The distal ends 122a of the first pistons 120a rotateably engage the first cam surface 128a the first multi-lobed cam ring 126a due to biasing forces of the coil springs 24. Also, an intake/discharge hole 119a is formed in a bottom portion of each of the first pressure chambers 118a.

Accordingly, the number of the second pistons 120b corresponds to the number of the second cylinder bores 116b in the hydraulic manifold block 114 so that each of the second pistons 120b is slideably disposed within corresponding one of the plurality of the second cylinder bores 116b in the hydraulic manifold block 114 for reciprocating therewithin upon relative rotational movement between the hydraulic manifold block 114 and the second multi-lobed cam ring 126b. Each of the second pistons 120b defines a second variable displacement pressure chamber 118b within the corresponding one of the plurality of the second cylinder bores 116b. Distal ends 122b of the second pistons 120b extend from the second cylinder bores 116b as the second pistons 120b are biased toward the second cam surfaces 128b of the second cam ring 126b by coil springs 24 disposed within the second pressure chambers 118b. The distal ends 122b of the second pistons 120a rotateably engage the second cam surface 128b the second multi-lobed cam ring 126b due to biasing forces of the coil springs 24. An intake/discharge hole 119b is formed in a bottom portion of each of the second pressure chambers 118b.

Preferably, the first pistons 120a and the corresponding first cylinder bores 116a are substantially identical to the second pistons 120b and the corresponding second cylinder bores 116b. The cylinder bores 116a and 116b and the pistons 120a and 120b are preferably ring-shaped. However, alternatively, they may alternatively have other suitable shapes. Preferably, the distal ends 122a and 122b of the pistons 120a and 120b are semi-spherical in shape.

As further illustrated in FIG. 6, each of the first pressure chambers 118a is in fluid communication with a first fluid reservoir 130a storing a supply of an appropriate hydraulic fluid, such as oil, through a first supply passageway 132a and a first discharge passageway 134a. Accordingly, each of the second pressure chambers 118b is in fluid communication with a second fluid reservoir 130b storing a supply of an appropriate hydraulic fluid, such as oil, through a second supply passageway 132b and a second discharge passageway 134b. Preferably, the both first fluid reservoir 130a and the second fluid reservoir 130b are integrally formed within the hydraulic manifold block 114. As the first and second pressure chambers 118a and 118b are in fluid communication with the corresponding fluid reservoirs 130a and 130b, the reciprocating movement of the first and second pistons 120a and 120b within the first and second cylinder bores 116a and 116b in the hydraulic manifold block 14 upon relative rotational movement between the hydraulic manifold block 14 and the first and second cam rings 126a and 126b provides a pumping action including alternating suction and discharge strokes.

During the suction stroke when the pistons 118a and 118b extend from the cylinder bores 116a and 116b of the hydraulic manifold block 114, volumes of the pressure chambers 118a and 118b increase and the hydraulic fluid is drawn into the pressure chambers 118a and 118b from the fluid reservoirs 130a and 130b, respectively, through the corresponding supply passageways 132a and 132b. Consequently, during the discharge stroke when the pistons 118a and 118b retract into the cylinder bores 116a and 116b, volumes of the pressure chambers 118a and 118b decrease and the hydraulic fluid is discharged under pressure from the pressure chambers 118a and 118b back to the fluid reservoirs 130a and 130b, respectively, through the corresponding discharge passageways 134a and 134b. In other words, the pressure chambers 118a and 118b function to cooperate with the pistons 120a and 120b to pressurize the hydraulic fluid during the discharge stroke of the pistons 120a and 120b.

Preferably, as shown in FIGS. 4-6, the hydraulic manifold block 114 of the differential assembly 110 in accordance with the second exemplary embodiment of the present invention comprises seven first cylinder bores 116a and seven second cylinder bores 116b, and seven associated first pistons 120a and seven second pistons 120b, while each of the multi-lobed cam rings 126a and 126b has six lobes. It will be appreciated that more or less first and second cylinder bores/pistons and cam lobes may be employed depending upon the relative dimensions and proportions of the particular arrangement of the torque coupling device.

In order to control the torque transfer through the differential assembly 110, two variable restrictor devices are provided: a first variable restrictor device 140a and a second variable restrictor device 140b, as illustrated in FIG. 6. The first variable restrictor device 140a is provided to selectively control the hydraulic pressure in the first pressure chambers 118a during the discharge stroke of the first pistons 120a, while the second variable restrictor device 140b is provided to selectively control the hydraulic pressure in the second pressure chambers 118b during the discharge stroke of the second pistons 120b.

Preferably, the first and second variable restrictor devices 140a and 140b are substantially identical to the variable restrictor device 40 of the first exemplary embodiment of the present invention. The first variable restrictor device 140a is located in the discharge passageway 134a in fluid communication with both the first reservoir 130a and the first pressure chambers 118a so that the hydraulic fluid is discharged from any of the pressure chambers 118a back to the first fluid reservoir 130a during the discharge stroke through the first restrictor device 140a. Similarly, the second variable restrictor device 130b is located in the discharge passageway 134b in fluid communication with both the second reservoir 130a and the second pressure chambers 118b so that the hydraulic fluid is discharged from any of the pressure chambers 118b back to the fluid reservoir 130b during the discharge stroke through the second restrictor device 140b.

As further illustrated in FIG. 6, the first and second variable restrictor devices 140a and 140b are operated by an electronic controller 145, which may be in the form of a CPU or a computer. The electronic controller 145 operates each of the first and second variable restrictor devices 140a and 140b independently based on the information from a number of sensors including, but not limited, an input speed sensor 146 and output speed sensors 148a and 148b. It will be appreciated by those skilled in the art that any other appropriate sensors, may be employed. For instance, if the differential assembly 110 is used in the drive axle unit 100 of the motor vehicle, a number of sensors sensing various vehicle parameter, such as vehicle wheel speed sensors 150, an engine torque sensor 152, a steering angle sensor 154, a yaw rate sensor 156, a longitudinal acceleration sensor 158, a lateral acceleration sensor 160, an ABS activation sensor that detects the activation of the anti-lock braking system, etc., also may be employed. Moreover, the electronic controller 45 may be connected to an electronic control network 162 of the motor vehicle.

The operation of the first exemplary embodiment of the present invention depicted in FIGS. 4-6 will now be described.

When no rotational speed difference occurs between the hydraulic manifold block 114 and any of the cam ring 126a and 126b, the pistons 120a and 120b do not reciprocate in the cylinder bores 116a and 116b, respectively, and the pistons 120a and 120b do not pump the hydraulic fluid into the pressure chamber 118a and 118b, respectively. Thus, the torque is not transferred through the differential assembly 110 from the housing 112 to the output shafts 102a and 102b. Therefore, the driving torque from an engine is not transferred to the drive axle unit 100.

When, however, the rotational speed differential between the output shafts 102a and 102b and the input shaft occurs (i.e., when there is relative rotational movement of the manifold block 114 and the cam rings 126a and 126b), the rotational speed differential between the manifold block 114 and the cam rings 126a and 126b causes the pistons 120a and 120b to reciprocate in the cylinder bores 116a and 116b since they slide on the crests and cam valleys of the cam surface 128a and 128b. When the pistons 120a and 120b reciprocate, the hydraulic fluid is alternately drawn into the pressure chambers 118a and 118b from the corresponding fluid reservoirs 130a and 130b through the supply passageways 132a and 132b and the intake/discharge holes 119a and 119b (during the suction stroke), and is discharged under pressure from the pressure chambers 118a and 118b back to the fluid reservoirs 130a and 130b through the intake/discharge holes 119a and 119b, the discharge passageways 134a and 134b and through the flow restriction provided by the variable restrictor devices 140a and 140b (the discharge stroke).

Those skilled in the art would appreciate that depending on the specific adjustment of each of the variable restrictor devices 140a and 140b by the electronic controller 145 various modes of operation of the differential assembly 110 could be realized. More specifically, if both of the variable restrictor devices 140a and 140b are adjusted to provide the minimum value of the hydraulic pressure attainable within the pressure chambers 118a and 118b during the discharge stroke (the fully "OFF" condition), no torque is transmitted through the drive axle unit 100 despite the relative rotation between the input and the output shafts 102a, 102b. In other words, the torque transfer rate of the differential assembly 110 when the variable restrictor devices 140a and 140b are in the fully "OFF" condition is zero.

On the other hand, if both of the variable restrictor devices 140a and 140b are adjusted to provide the maximum value of the hydraulic pressure attainable within the pressure chambers 118a and 118b during the discharge stroke (the fully "ON" condition), all the torque from the housing 112 to the output shafts 102a, 102b is transmitted through the differential assembly 110 (i.e. from the hydraulic manifold block 114 and the cam rings 126a, 126b), and the differential assembly 110 is locked. In other words, the torque transfer rate of the differential assembly 110 when the variable restrictor devices 140a and 140b are in the fully "ON" condition is 100%.

Evidently, by independently adjusting the variable restrictor devices 140a and 140b to provide the value of the hydraulic pressure attainable within the pressure chambers 118a and 118b during the discharge stroke of the pistons 120a and 120b between the "ON" and "OFF" conditions, the torque transfer rate of the differential assembly 110 from the drive pinion to any of the output shafts 102a, 102b may be continuously and selectively varied in the 0-100% range by the electronic controller 145 based on the information from the sensors 146, 148a, 148b, 150, 152, 154, 156, 158 and 160. The increase in pressure available may be a function of the speed difference. This will result in an optimized amount of limited slip between the fully "ON" and "OFF" conditions. Thus, the amount of the limited slip available to the differential assembly 110 can be limited and optimized to match various vehicle operating conditions. For instance, the differential assembly 110 allows 100% of the available drive torque to be delivered to one of the wheels 104a, 104b, while no torque is delivered to the other one of the wheels 104a, 104b. Moreover, by variably adjusting the restrictor devices 140a and 140b, the necessary speed differential between the left and right wheels 104a and 104b may be achieved. The independent control the first and second restrictor devices 140a and 140b allows the torque distribution to and between each of the side wheels 104a and 104b of the same axle unit 100 to be tailored independently and to be infinitely adjustable.

Therefore, the present invention represents a novel arrangement of the electronically controlled torque coupling device comprising at least one restrictor device in fluid communication with pressure chambers within a rotatable hydraulic manifold block s such that the at least one restrictor device controls a hydraulic pressure in the pressure chambers. The torque coupling device of the present invention provides an opportunity to be dynamically controlled to match various operating conditions of apparatuses or machines employing the differential assembly of the present invention, such as motor vehicles. Moreover, no electrical power is necessary to activate the torque coupling device of the present invention, only minimum electrical power is required to power the electronic controller.

The foregoing description of the preferred exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A torque coupling device comprising:
a hydraulic manifold block rotatable about an axis of rotation, said hydraulic manifold block including a plurality of axially extending first cylinder bores defined therein;
a first multi-lobed cam ring rotatable relative to and coaxially with said hydraulic manifold block;
a plurality of first pistons each disposed within corresponding one of said plurality of first cylinder bores in said hydraulic manifold block for reciprocating therewithin upon relative rotational movement between said hydraulic manifold block and said first multi-lobed cam ring, said plurality of first pistons engaging with said first multi-lobed cam ring at distal ends thereof;
said plurality of first pistons defining a corresponding plurality of first variable displacement pressure chambers within said corresponding one of said plurality of first cylinder bores;
a first restrictor device in fluid communication with each of said plurality of first pressure chambers such that said first restrictor device controls a discharge pressure attainable within each of said plurality of first pressure chambers during discharge strokes of said plurality of first pistons; and
a first fluid reservoir disposed within said hydraulic manifold block for storing a supply of a hydraulic fluid, said first fluid reservoir is in fluid communication with each of said plurality of first pressure chambers and said first restrictor device.

2. The torque coupling device as defined in claim 1, wherein said first restrictor device is disposed within said hydraulic manifold block.

3. The torque coupling device as defined in claim 1, wherein said hydraulic manifold block is non-rotatably coupled to one of an input shaft and an output shaft.

4. The torque coupling device as defined in claim 3, wherein said first multi-lobed cam ring is non-rotatably coupled to the other one of said input shaft and said output shaft.

5. The torque coupling device as defined in claim 1, wherein said first restrictor device selectively and variably controls said hydraulic pressure in said first pressure chambers.

6. The torque coupling device as defined in claim 1, wherein said first restrictor device is selectively and variably controlled by an electronic controller in response to at least one vehicle parameter.

7. The torque coupling device as defined in claim 1, wherein said first restrictor device is provided to selectively set said discharge pressure attainable within each of said plurality of first pressure chambers between a maximum pressure value and a minimum pressure value.

8. The torque coupling device as defined in claim 7, wherein said minimum pressure value is at a level that prevents actuation of said torque coupling device.

9. The torque coupling device as defined in claim 7, wherein said maximum pressure value is at a level that enables complete actuation of said torque coupling device.

10. The torque coupling device as defined in claim 7, wherein said discharge pressure attainable in each of said plurality of first pressure chambers is adjustable between said minimum pressure value and said maximum pressure value so as to enable partial actuation of said torque coupling device.

11. The torque coupling device as defined in claim 1, wherein said plurality of first cylinder bores are axially extending in the direction of said axis of rotation.

12. The torque coupling device as defined in claim 1, further comprising:
    a plurality of second cylinder bores defined in said hydraulic manifold block opposite said plurality of first cylinder bores;
    a second multi-lobed cam ring rotatable coaxially with said hydraulic manifold block, said first and second multi-lobed cam rings disposed on opposite sides of said hydraulic manifold block;
    a plurality of second pistons each disposed within corresponding one of said plurality of second cylinder bores in said hydraulic manifold block for reciprocating therewithin upon relative rotational movement between said hydraulic manifold block and said second multi-lobed cam ring, said plurality of second pistons engaging with said second multi-lobed cam ring at distal ends thereof;
    said plurality of second pistons defining a corresponding plurality of second variable displacement pressure chambers within said corresponding one of said plurality of second cylinder bores; and
    a second restrictor device in fluid communication with each of said plurality of second pressure chambers such that said second restrictor device controls a discharge pressure attainable within each of said plurality of second pressure chambers during discharge strokes of said plurality of second pistons; and
    a second fluid reservoir disposed within said hydraulic manifold block for storing a supply of a hydraulic fluid, said second fluid reservoir is in fluid communication with each of said plurality of second pressure chambers and said second restrictor device.

13. The torque coupling device as defined in claim 12, wherein said second restrictor device is disposed within said hydraulic manifold block.

14. The torque coupling device as defined in claim 12, wherein said hydraulic manifold block is non-rotatably coupled to an input shaft.

15. The torque coupling device as defined in claim 12, further including first and second output shafts, wherein said first cam ring is non-rotatably coupled to said first output shaft and said second cam ring is non-rotatably coupled to said second output shaft.

16. The torque coupling device as defined in claim 12, wherein each of said first and second restrictor devices is independently, selectively and variably controlled by an electronic controller in response to at least one vehicle parameter.

17. The torque coupling device as defined in claim 12, wherein each of said first and second restrictor devices is provided to selectively set said discharge pressure attainable within each of said respective pluralities of first and second pressure chambers between a maximum pressure value and a minimum pressure value.

18. The torque coupling device as defined in claim 17, wherein each of said first and second restrictor devices set to said minimum pressure value of said discharge pressure prevents any torque transmission from said hydraulic manifold block to said respective first and second cam rings.

19. The torque coupling device as defined in claim 17, wherein each of said first and second restrictor devices set to said maximum pressure value of said discharge pressure enables positive coupling of said hydraulic manifold block and said respective first and second cam rings.

20. The torque coupling device as defined in claim 17, wherein said discharge pressure attainable in each of said pluralities of first and second pressure chambers is adjustable between said minimum pressure value and said maximum pressure value so as to enable partial torque transmission from said hydraulic manifold block to each of said first and second cam rings.

21. The torque coupling device as defined in claim 12, wherein said plurality of second cylinder bores are axially extending in the direction opposite to said plurality of first cylinder bores.

* * * * *